US006351085B1

(12) United States Patent
Tominaga

(10) Patent No.: US 6,351,085 B1
(45) Date of Patent: Feb. 26, 2002

(54) COLOR CATHODE RAY TUBE DISPLAY

(75) Inventor: Kiyonori Tominaga, Kanagawa (JP)

(73) Assignee: Sony Corporation, Tokyo (JP)

( * ) Notice: Subject to any disclaimer, the term of this patent is extended or adjusted under 35 U.S.C. 154(b) by 37 days.

(21) Appl. No.: 09/694,818

(22) Filed: Oct. 24, 2000

(30) Foreign Application Priority Data

Oct. 26, 1999 (JP) .......................................... 11-303313

(51) Int. Cl.⁷ ................................................ H01J 29/80
(52) U.S. Cl. ........................ 315/369; 315/371; 315/376
(58) Field of Search ................................ 315/370, 371, 315/372, 379, 376, 369

(56) References Cited

U.S. PATENT DOCUMENTS 3,887,838 A * 6/1975 Thurston ..................... 315/376

* cited by examiner

*Primary Examiner*—David Vu
(74) *Attorney, Agent, or Firm*—Ronald P. Kananen; Rader, Fishman & Grauer

(57) ABSTRACT

As described above, according to the present invention, there is provided a color CRT display having a one-beam electron gun for reproducing colors by sequentially switching respective chrominance signals, R, G, and B, supplied to the one-beam electron gun. The color CRT display is characterized in that a color image displayed on a CRT screen is picked up by a CCD image pickup device and the image pickup signal is stored in an image pickup signal memory, the image pickup signal is compared with an original video signal stored in a video signal memory in terms of components of chromaticity using an arithmetic operator, and the frequency and phase of the image pickup signal of a VCO, which are required for determining the switching timing of chrominance signals in a multiplexer, are adjusted so that the difference between the image pickup signal and the original video signal in terms of components of chromaticity is minimized. With this configuration, it is possible to reproduce stably colors without generation of a black compression, even when the color CRT display is applied to a high precision display.

9 Claims, 6 Drawing Sheets

ELECTRON BEAM MAIN SCANNING DIRECTION $$C = s \cdot \exp(j\phi c)$$
$$= R + G + B$$
$$= R \cdot \exp(-j\phi 2) + G + B \cdot \exp(j\phi 1)$$

COLOR CATHODE RAY TUBE DISPLAY

Background of the Invention

The present invention relates to a color cathode ray tube (CRT) display, in particular it relates to a color CRT display which has a one-beam electron gun and reproduces colors by switching color signals, R (Red), G (Green), and B (Blue), in regular succession which are supplied to the onebeam electron gun.

As a color CRT display, one which has three-beam electron guns which emit 3 electron beams for energizing respective phosphors, R, G, and B, and uses a shadow mask as a color selection electrode, is widely known. Similarly, the CRT display of the Trinitron system, having three-beam electron guns and using an aperture grille as a color selection electrode also is widely known. The two points as described in the following can be cited as common defects to these three-gun color CRT displays.

(1) Color misregistration can occur by being influenced by an external magnetic field. The influence of a static magnetic field such, as the earth's magnetism, can be prevented by using a magnetic shield and a degauss coil. However, when a CRT is used in a fluctuating magnetic field such as the field close to a railway, it is apt to be influenced by an external field. Further, when there are other electronic appliances or magnets close to the display, the color misregistration can be caused by them.

(2) Convergence adjustment is required for converging the three electron beams corresponding to R, G, and B emitted from the three guns at a point on a color selection electrode (shadow mask, aperture grille). In particular, in the case of a high precision display corresponding to a graphics display standard such as a UXGA (ultra extended graphics array), high precision convergence correction is required.

There is a color CRT display of a beam-index system which is contrived to solve the problems with a color CRT display of the shadow mask system or the Trinitron system.

The color CRT display of the beam-index system has a one-beam electron gun and is constituted with a fluorescent screen having phosphor stripes, R, G, and B, and carbon (black) stripes between respective phosphor stripes.

When the fluorescent screen is scanned by an electron beam emitted from the one-beam electron gun, the chrominance signals input to the electron gun are switched corresponding to the color of a phosphor stripe irradiated by the electron beam, thus respective colors are displayed. An index stripe separately provided on the fluorescent screen is used for the switching of the chrominance signals.

When the color CRT display of the beam-index system having a constitution as mentioned in the above is applied to a high precision display corresponding to a UXGA display standard, the number of the phosphor stripes of R, G, and B is increased. Therefore, it is necessary to increase the number of index stripes corresponding to the degree of preciseness. When the number of index stripes is increased, the index frequency becomes higher.

However, a phosphor for index stripes having enough short afterglow time does not exist at present. Thereby, when the index frequency becomes high, the detectable index signal quantity is decreased. In such a case, a black level beam current that is made to flow as a minimum beam current becomes large in order to obtain a stable index signal even at a black video signal. Therefore, a black compression is apt to be generated and, in this case, the contrast is substantially degraded.

Summary of the Invention

It is an object of the present invention to provide a beam-index system color CRT display of a one-beam electron gun which is able to perform stable color reproduction even in a case where it is applied to a high precision display without generating a black compression.

A color CRT display, according to the present invention, comprises a one-beam electron gun which emits an electron beam and a fluorescent screen on which phosphor stripes, which emit R, G, and B rays of light when irradiated by the electron beam, are disposed in regular succession in the main scanning direction of the electron beam, and wherein the chrominance signals, R, G, and B, to be supplied to the one-beam electron gun, are switched over to each other in regular succession for the reproduction of colors.

The color CRT display comprises an image pickup device for picking up a color image displayed on the screen of the CRT, a first storage means for storing the image pickup signal outputted from the image pickup device, a second storage means for storing an input video signal, a switching means for switching over respective chrominance signals, R, G, and B, of the input video signals to be supplied to the one-beam electron gun, a variable frequency oscillator means for outputting an oscillation frequency signal which becomes the base of switching timing of chrominance signals by the switching means, a phase modulation means for phase-modulating the oscillation signal output from the variable frequency oscillator means and. for supplying the modulated signal to the switching means as a switching control signal, and a control means which compares the component of chromaticity of the image pickup signal stored in the first storage means with the component of chromaticity of the video signal stored in the second storage means and controls the oscillation frequency of the variable frequency oscillator means and the phase modulation by the phase modulation means to make the difference obtained by the comparison minimum.

In a color CRT display having the configuration mentioned above, when an electron beam scans the phosphor stripes, R, G, and B, on the fluorescent screen in the main scanning direction in order, the respective chrominance signals, R, G, and B, to be supplied to the one-beam electron gun is switched over to each other in regular succession by the switching means. Thus, a color image is displayed on the CRT screen, and the color image is picked up by an image pickup device. The image pickup signal is stored in the first storage means.

On the other hand, the video signal being the base of the color image is stored in the second storage means. The control means compares respective components of chromaticity between the image pickup signal and the video signal stored in respective storage means and controls the oscillator frequency and the phase modulation which are the base of the switching timing of respective chrominance signals, R, G, and B, to minimize the result of the above comparison.

Thereby, even in the case where the present invention is applied to a high-precision display, a color misregistration can be prevented by the above mentioned feedback control, so that the color reproduction can be stably performed without generating a color misregistration or a black compression caused by an external magnetic field.

The above and other objects, features and advantages of the present invention will become apparent from the following description and the appended claims, taken in conjunction with the accompanying drawings in which like parts or elements denoted by like reference symbols.

Detailed Description of the Preferred Embodiments

Figure 1:
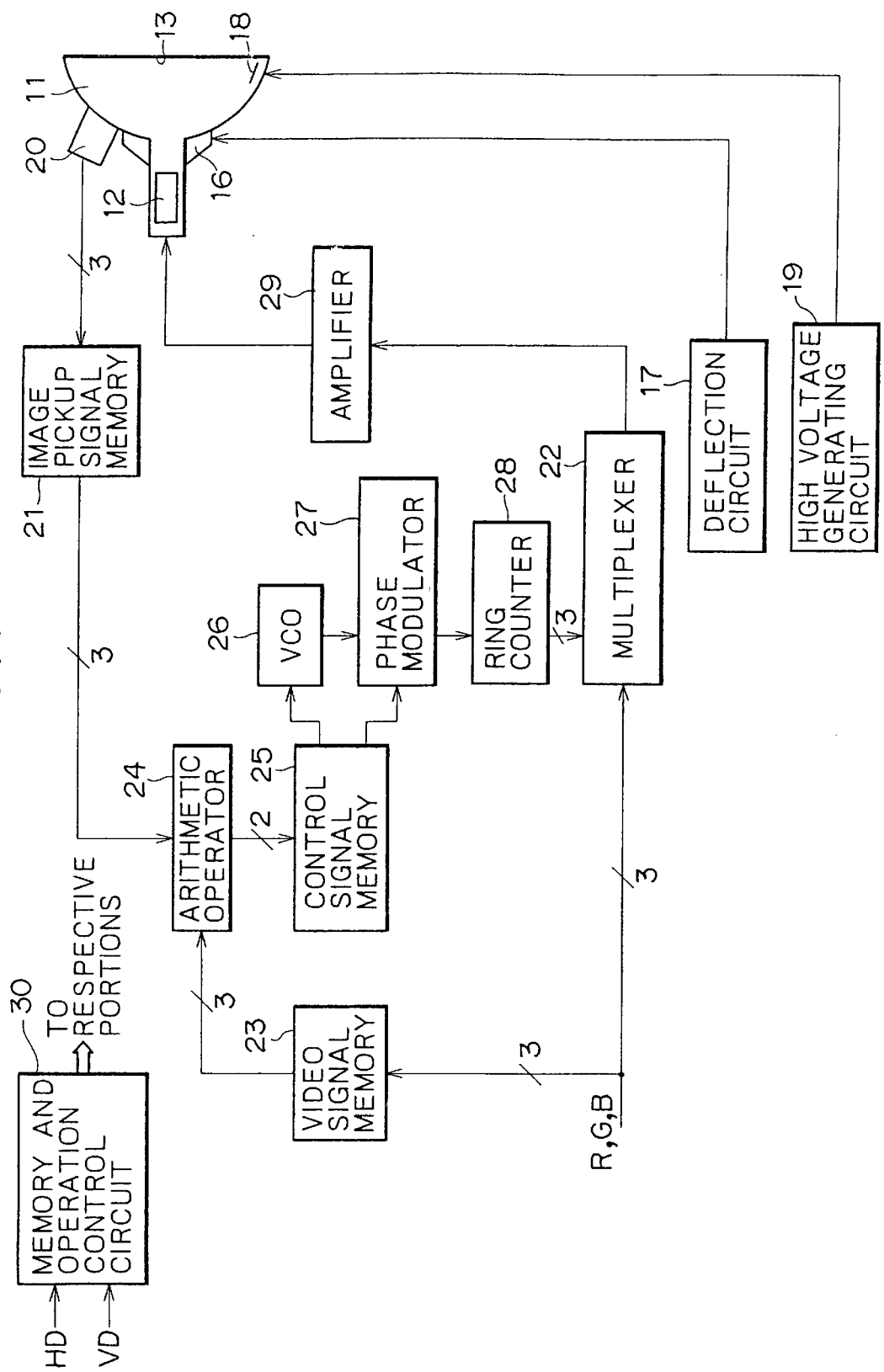
FIG. 1 is a block diagram showing the configuration of a color CRT display in the first embodiment.

In the following, the embodiments according to the present invention will be explained referring to the drawings.

First Embodiment

Figure 2:
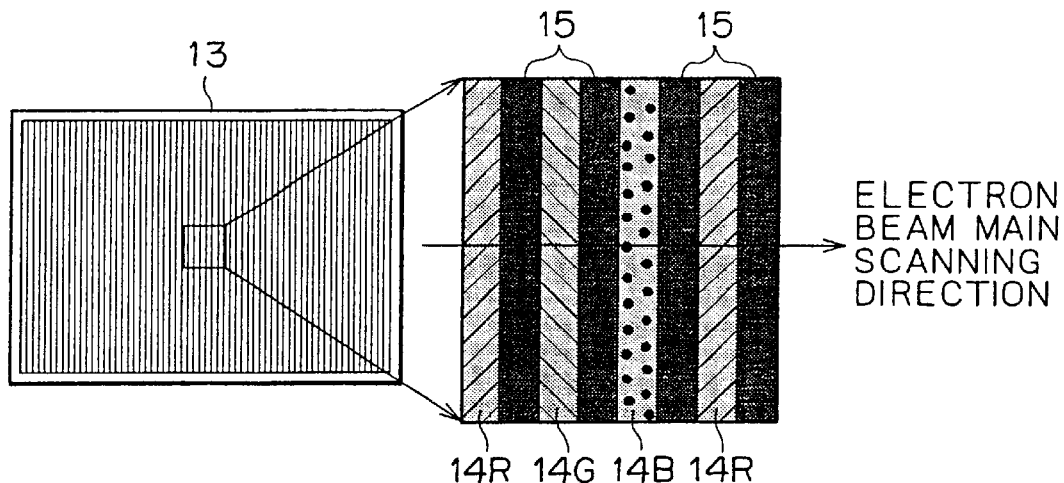
FIG. 2 is an illustrative diagram showing an enlarged part of the fluorescent screen.

As shown in FIG. 1, the CRT 11 comprises a one-beam electron gun 12 which emits an electron beam and is mounted in the rear end portion of the CRT 11, and a fluorescent screen 13 disposed on the inner surface of the front panel of the CRT 11. The fluorescent screen 13 comprises, as shown in FIG. 2, a group of phosphor stripes, that is, chrominance phosphor stripes (filament), 14R, 14G, and 14B, and carbon stripes 15 therebetween, that are regularly disposed in order in the direction of the main scanning of the electron beam (in the horizontal direction).

In the CRT 11, an electron beam emitted from the cathode of the one-beam electron gun 12 is converged by a focusing electrode so that the beam spot size on the fluorescent screen 13 in the main scanning direction becomes approximately equal to the width of each of the chrominance phosphor stripes, 14R, 14G, and 14B. The electron beam emitted from the electron gun 12 is deflected in the vertical and horizontal directions by a deflection yoke 16 disposed in the neck portion of the CRT 11 to irradiate the chrominance phosphor stripes, 14R, 14G, and 14B, and a color image is reproduced on the screen of the CRT 11.

The deflection yoke 16 comprises a horizontal deflection coil and a vertical deflection coil (both of them are not shown in the drawing). Horizontal and vertical deflection currents are supplied from a deflection circuit 17 to them. A high voltage generated in a high voltage generating circuit 19 is applied to a high voltage electrode 18 inside the CRT 11. It is to be noted that the CRT 11 does not have a mechanical color selection mechanism, such as a shadow mask or a aperture grille, but has a transparent window portion in a part of the funnel portion. In this window portion, an image pickup device for picking up a color image displayed on the screen of the CRT 11, for example, a CCD (Charge Coupled Device) image pickup device 20, is provided.

One field portion of the image pickup signal from the CCD image pickup device 20 is stored in an image pickup signal memory 21, a first storage means. On the other hand, analog video input signals, R, G, and B (three channels), are supplied to a multiplexer 22, a switching means, and at the same time one field portion of the video signal is stored in a video signal memory 23, a second storage means. The image pickup signal stored in the image pickup signal memory 21 and the video signal stored in the video signal memory 23 are supplied.to an arithmetic operator 24. The arithmetic operator 24 compares the component of chromaticity of the image pickup signal stored in the image pickup memory 21 with the component of chromaticity of the video signal stored in the video signal memory 23, and outputs a control signal which minimizes the result of comparison.

The control signal outputted from the arithmetic operator 24 is stored in a control signal memory 25, a third storage means. After that, the control signal is supplied to a VCO (voltage controlled oscillator) 26, a variable frequency oscillator means, as a frequency control voltage, and also to a phase modulator 27 as a modulation control voltage. The VCO 26 outputs an oscillation frequency which is the base of switching timing of the chrominance signals in the multiplexer 22. The oscillation output of the VCO 26 is supplied to a ring counter 28 after it is phase-modulated in the phase modulator 27.

The output of the ring counter 28 is supplied to the multiplexer 22 as a switching control signal which controls the switching timing of the chrominance signals. The multiplexer 22 selects one of the video input signals, R, G, and B, with the switching control signal from the ring counter 28, and outputs the selected one. The selected video signal is supplied to a first grid electrode of the electron gun 12 after it is amplified in an amplifier 29.

The control of the pickup image signal memory 21, the video signal memory 23, the control signal memory 25, the arithmetic operator 24, and further the driving of the CCD image pickup device 20 are performed by various kinds of timing signals output from the memory and operation control circuit 30. The memory and operation control circuit 30 generates various kinds of timing signals based on the horizontal synchronizing signal HD or the vertical synchronizing signal VD separated from the video signal.

Next, the circuit operation of the color CRT display in the first embodiment having the configuration described in the above will be explained.

At first, the principle of color reproduction will be explained. The beam spot of an electron beam emitted from the electron gun 12 is made to traverse the chrominance phosphor stripes, 14R, 14G, and 14B, on the fluorescent screen 13, as shown in FIG. 2, by the main scanning. At the timing when the position of the beam spot is on the chrominance phosphor stripe 14R, R signal is supplied to the electron gun 12. At the timing when the beam spot is on the phosphor stripe 14G, G signal is supplied to the electron gun 12. At the timing when the beam spot is on the phosphor stripe 14B, B signal is supplied to the electron gun 12. The color reproduction is performed by synchronizing the switching timing of respective chrominance signals R, G and B, with the movement of the beam spot to modulate the current of the electron beam.

In other words, analog R, G, and B video input signals (three channels) are supplied to the multiplexer 22. In the multiplexer 22, one out of R, G, and B, video input signals is selected by the switching control performed by the switching control signal supplied by the ring counter 28. The selected video input signal (R/G/B) is amplified by an amplifier 29 and supplied to the first grid electrode of the electron gun 12 to modulate the current of the electron beam.

The switching timing signal of respective chrominance signals, R, G, and B, is obtained by driving the ring counter with the output of the VCO 26 phase-modulated in the phase modulator 27. The output of the VCO 26 is frequency-modulated by the frequency control data read out from the control signal memory 25. The VCO 26 is controlled to start oscillating at a fixed phase by a pulse which is delayed by a fixed period of time, that is, from the horizontal synchronizing pulse HD till a time a little before the start of an image, and to stop oscillating during the horizontal blanking period.

Figure 4:
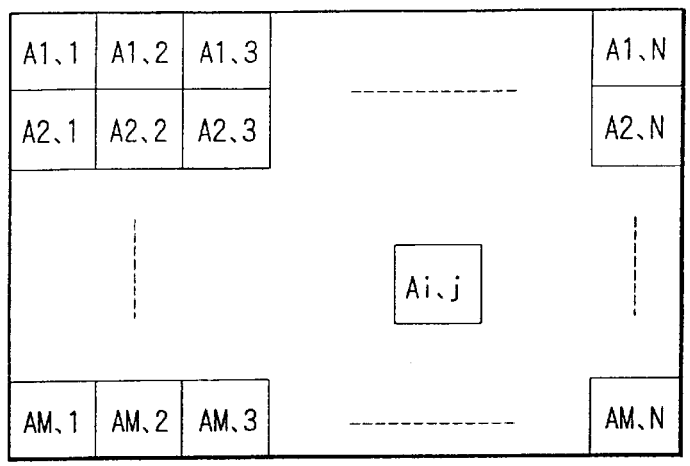
FIG. 4 is a diagram showing a state where the screen in the first embodiment is divided into small areas of M X N pieces.

In the phase modulator 27, a signal is phasemodulated with the phase data read out from the control signal memory 25. At this time, only the phase data corresponding to a small area, $A_{1,1}$ (refer to FIG. 4.), at the starting portion of the main scanning, that is, at the left and upper end of the screen, are read out from the control signal memory 25.

Figure 3:
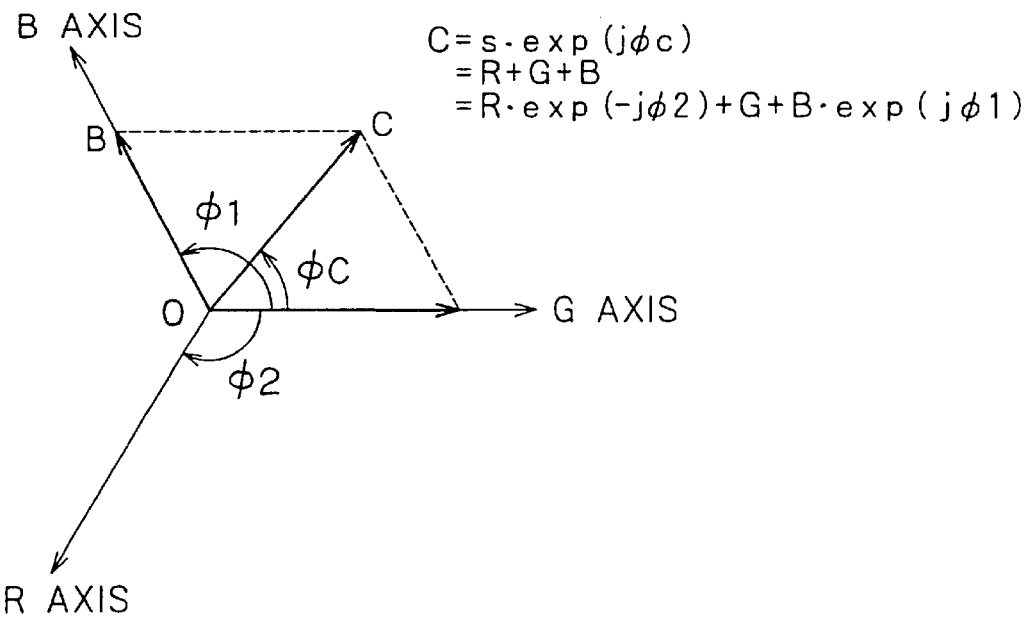
FIG. 3 is a vector diagram illustrating the arithmetic principle of a component of chromaticity.

The arithmetic operator 24 divides a screen of 1 field into a plurality of small areas, and it calculates a component of chromaticity for a small area, as shown in. FIG. 3. In FIG. 3, R axis, G axis and B axis are decided according to the order of dispositions of respective chrominance phosphor stripes, 14R, 14G and 14B, in the direction of the main scanning of an electron beam, and to the intervals between respective chrominance phosphor stripes, 14R, 14G and 14B.

In ot her words, assuming that, for example, the G axis is the standard axis, in a case where the respective chrominance phosphor stripes 14R, 14B and 14G are disposed in the order as shown in FIG. 2 and spaced at regular intervals, i.e., $\phi 1 = 2\pi/3$, $\phi 2 = -2\pi/3$. The R, G, and B in the equation shown in FIG. 3 are obtained through the calculation of the equations $R = \Sigma Ri$, $G = \Sigma Gi$, and $B = \Sigma Bi$, using one or a plurality of video pixel data selected from one of the small areas. A vector C shown in FIG. 3 is a component of chromaticity to be found.

The arithmetic operator 24, in a similar way to the above, calculates the equations and obtains the component of chromaticity from the image pickup data stored in the image pickup signal memory 21 and is taken as a vector C'. The difference between the argument $\phi c$ of the vector C and the argument 100 c' of the vector C', $\Delta\phi c (= \phi c + \phi c')$, is multiplied by a proper coefficient $\alpha$, and the result is taken as a phase difference data. The $\Delta\phi c$ means the difference between the actual color switching timing and the ideal color switching timing in which color reproduction is correctly performed.

Further, the arithmetic operator 24 reads out old phase data corresponding to the same small area from the control signal memory 25 and adds the phase difference data to the old phase data: thus, the new phase data to be used in the next field are obtained. The old phase data in the control signal memory 25 are rewritten to new data. That is, the phase data to be stored in the control signal memory 25 are updated.

In the above process, in the case where the magnitude of the vector C or the vector C' becomes zero, the phase difference data is substituted by zero. In short, in this case, the update of phase data is not performed substantially. Such a case may occur when there is no component of chromaticity in an input signal, that is, the input signal is black, white or gray. Such a case may also occur when a black or white compression is generated in the image to be reproduced in the CRT 11.

By repetition of the above mentioned processes in each of the small areas, new phase data corresponding to the number of small areas are calculated, and they are stored in the control signal memory 25.

The frequency control data are calculated as shown below. It is assumed that a screen of one field is divided into small areas of M×N pieces. For convenience sake, these small areas are expressed with numeral subscripts as $A_{1,1}$, $A_{1,2}$, $A_{1,3}$, ● ● ●.

The difference in the horizontal direction of new phase data stored in the control signal memory 25 is obtained by subtracting new phase data corresponding to a small area, $A_{i, j+1}$, from new phase data corresponding to a small area, $A_{i, j}$. The result of subtraction is multiplied by a proper coefficient $\beta$ to obtain new frequency control data to be used in the next field.

Then, the old frequency control data in the control signal memory 25 are rewritten to the new frequency control data. The update of frequency control data corresponding to the right side end on the screen, that is, corresponding to the small area $A_{i, N}$ at an end portion of the main scanning, is different from the above update of phase data in that an extrapolative operation is performed. However, the update of the frequency control data in the control signal memory 25 is performed in the same way.

By the repetition of the above mentioned processes in every small area, new frequency control data of M×N groups are calculated and stored in the control signal memory 25.

The above mentioned arithmetic processes and the data updating processes in the control signal memory 25 are performed through the control of the image pickup signal memory 21, the video signal memory 23, the arithmetic operator 24 and the control signal memory 25 by the memory and operation control circuit 30 synchronized with the horizontal synchronizing signal HD and vertical synchronizing signal VD. These processes are completed within one field period.

Figure 5:
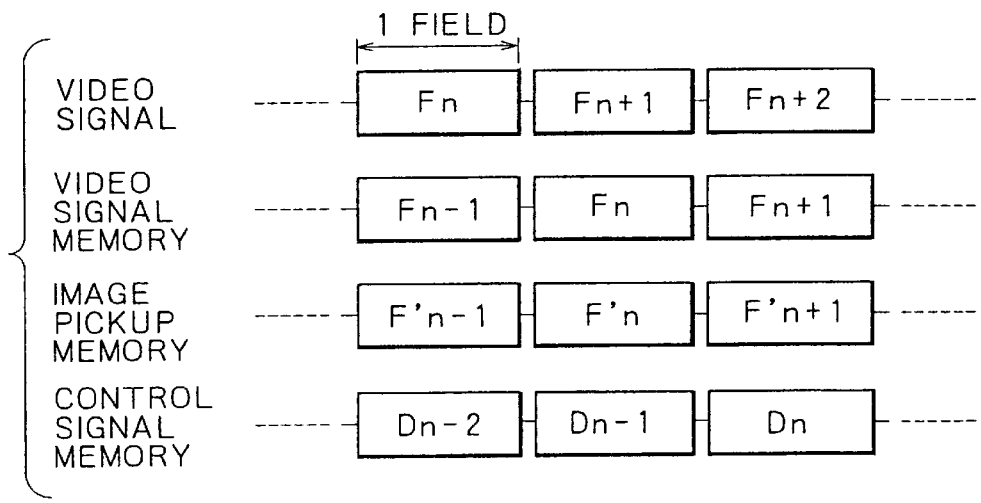
FIG. 5 is a timing chart for illustrating an arithmetic operation of a processor in the first embodiment.

Next, referring to the timing chart shown in FIG. 5, timing relations in a field unit among the video input signal, video data stored in the video memory 23, pickup image data stored in the pickup image signal memory 21, the phase data and the frequency control data stored in the control signal memory 25 will be explained.

It is assumed that for a certain period of time the image of the (n+2)th field is being reproduced on the screen of the CRT 11. At this time, as the video data in the video signal memory 23, the video data in the (n+1)th field are being updated in succession to the video data in (n+2)th field; however, in the above mentioned calculation of the control signal, the video data of (n+1)th field before the update are used.

On the other hand, in the pickup image signal memory 21, the reproduced image on the screen of the CRT 11 of the (n+1)th field is taken, so that for the calculation of the control signal the pickup image data of the (n+1)th field are used. Concerning the phase data and the frequency control data to be stored in the control signal memory 25, the data based on the video signal of the nth field are being updated in succession to the data based on the (n+1)th field; however, for the control of the VCO 26 and the phase modulator 27, the data based on the video signal of the nth field before the update are used.

In other words, in a color image reproduced on the CRT 11, in any field, color switching timing is determined by the phase data and the frequency control data obtained through the calculation based on the inputted video signal of two fields before. Therefore, by the repetition of the above mentioned operation, the color misregistration caused by a change with the passage of time or temperature drift of the deflection circuit 17 can be constantly corrected, so that correct color reproduction can be performed.

As mentioned in the above, in the case of the color CRT display in the first embodiment, when the color reproduction is performed by switching respective chrominance signals, R, G, and B, to be supplied to the one-beam electron gun 12 in regular succession by the multiplexer 22, the color image displayed on the screen of the CRT 11 is picked up by a CCD image pickup device 20. The image pickup signal obtained there is stored in the image pickup signal memory 21, and the component of chromaticity is compared with that of the original video signal stored in the video signal memory 23. The oscillation frequency and the phase of the VCO 26, which is to be the base of the switching timing of color signals in the multiplexer 22, are adjusted to minimize the above mentioned comparison result. Thereby, since a feedback control constantly works to minimize the color misregistration, the color misregistration caused by an external magnetic field can be prevented and correct color reproduction can be performed.

In comparison with the color CRT display of a shadow mask system or a Trinitron system, owing to the one-beam system, the color display in the first embodiment does not need any convergence correction means. Further, the display has no aperture grille or shadow mask, so that the CRT can be lightweight. Further-more, the coefficient of utilization of an electron beam is higher by 3 times, so that at the same luminance level, power consumption can be saved.

The present display does not need the minimum beam current that is required in a color CRT display of the beam-index system to obtain the index signal stably, even in a case where a dark image is generated. Therefore, the stable color reproduction without a black compression can be obtained in the present display.

An interpolative calculation circuit is substantially provided in the succeeding stage to the control signal memory 25, though the circuit is not shown in FIG. 1. When data are read out from the memory 25, an interpolative calculation is performed in order that the adjacent small areas are connected smoothly to each other. Thereby, even in a system having a configuration where a component of chromaticity is calculated in every small area by dividing the screen into small areas, it is possible to connect adjacent small areas smoothly. When the number of these small areas becomes large and the small areas are set so small as the data in the control signal memory 25 corresponding to the adjacent small areas can be regarded as smooth enough, there is no need to perform interpolative calculation.

In the above embodiment, in the arithmetic operator 24, the phase data and the frequency control data are obtained based on the input video signal of 2 fields before; however, it is also possible to have a configuration in which the phase data and the frequency control data are decided based on the input signal of the 1 field before. In this case, there is an advantage in that the activation of correct color reproduction can be reached faster.

Figure 6:
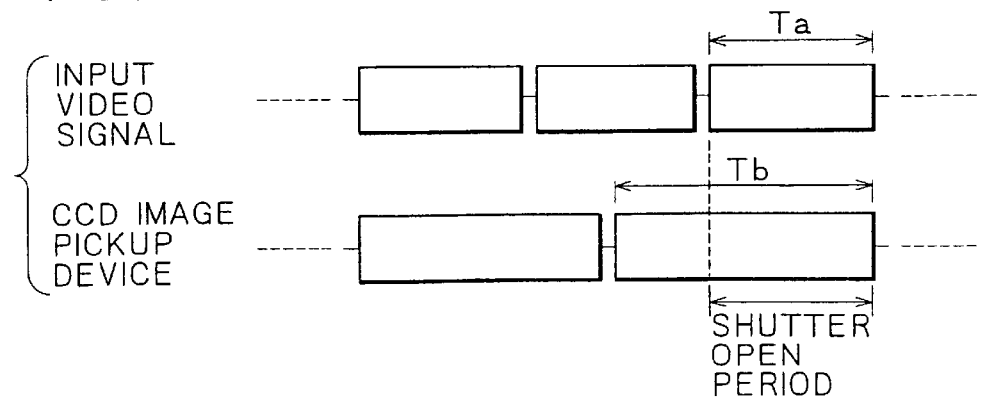
FIG. 6 is a timing chart for illustrating a variation of an arithmetic operation of a processor in the first embodiment.

In the above embodiment, the explanation is given assuming that the field period (the period of a vertical sync) of the CCD image pick means 20 is equal to that of the input video signal, but it is not necessarily needed to be the same. In a case where the present invention is to be applied to a more precise display, the field period of the video signal becomes shorter, and such a case can occur where the field period of the CCD image pickup device 20 becomes impossible to follow the field period of the video signal. In other words, as shown in FIG. 6, this is the state that the field period Tb of the CCD image pickup device 20 is set longer than the field period Ta of the input video signal is realized.

In such a case, it shall be so arranged that the shutter open period of the CCD image pickup device 20 is adjusted to the field period Ta of the input signal and also that the field period Ta of the input video signal is included in the field period Tb of the CCD image pickup device 20. In the above mentioned calculation process, the arithmetic operator 24 and the update process of data in the control signal memory 25 should be repeated at the period of the difference between the field period Tb of the CCD image pickup device 20 and the field period Ta of the input video signal, and the above processes should be completed within one period of repetition. In this case, the timing control is performed by the memory and operation control circuit 30.

Second Embodiment

Figure 7:
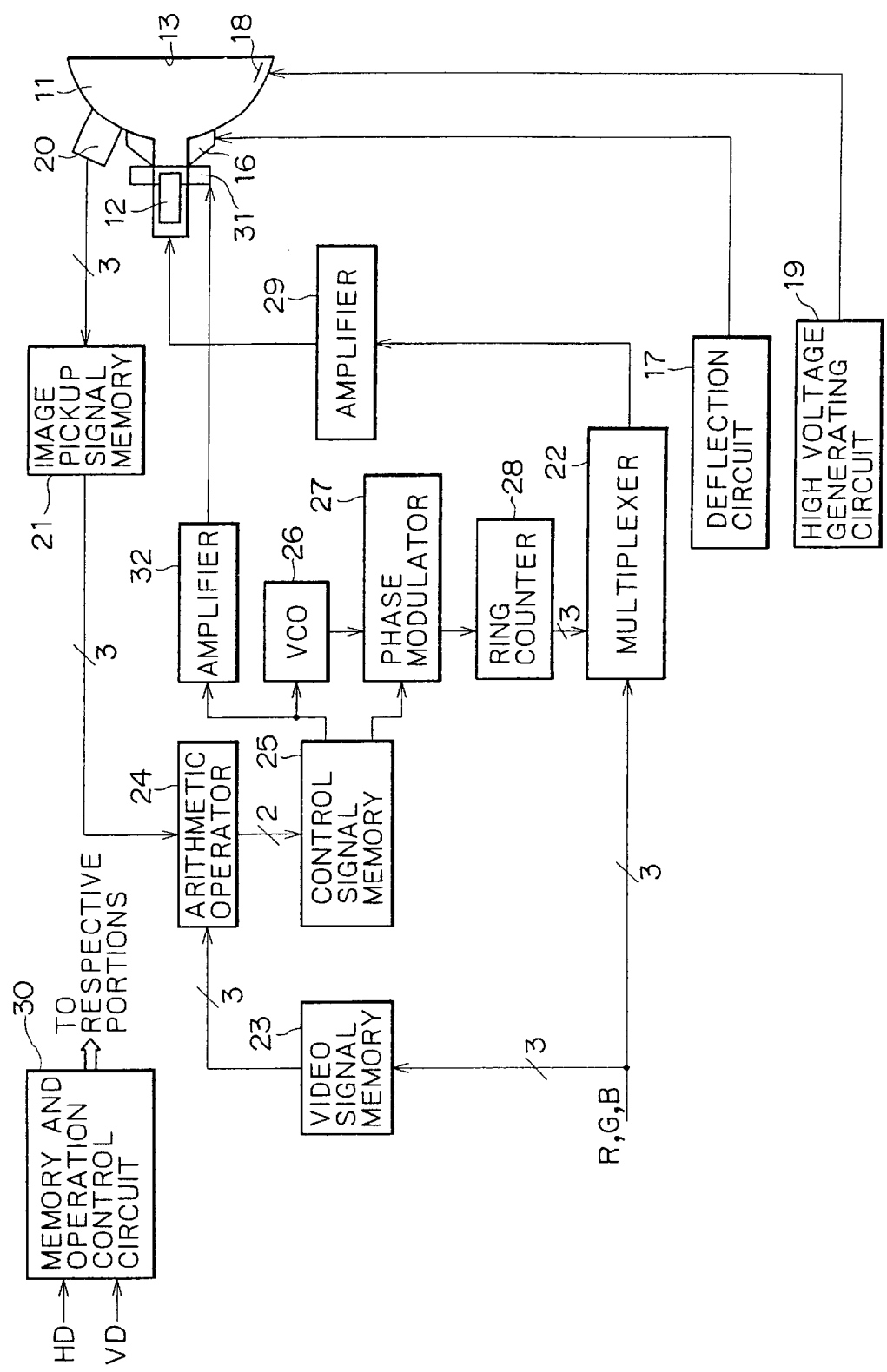
FIG. 7 is a block diagram showing the configuration of the color CRT display in the second embodiment.

FIG. 7 is a block diagram showing the configuration of a color CRT display in the second embodiment according to the present invention. In the case of the color CRT display in the second embodiment, a correction means for correcting the linearity of the horizontal scanning is added to the color CRT display in the first embodiment.

In other words, in CRT 11 a sub-yoke 31, other than the deflection yoke 16, is provided, and the frequency control data read out from the control signal memory 25 is amplified with an amplifier 32 and supplied to the sub-yoke 31 as a driving voltage. In this configuration, other than the main deflection by the deflection yoke 16, a sub-horizontal deflection is performed by the flow of a correction current through the sub-yoke 31.

As mentioned in the above, in the color CRT display in the second embodiment, the sub-yoke 31 is provided and is voltage driven by a voltage generated based on the frequency control data read out from the control signal memory 25; thus, a sub-horizontal deflection is performed by the sub-yoke 31. Thereby, in addition to the effect of the color CRT display in the first embodiment, the linearity of the horizontal scanning is improved, so that it is made possible to remove the image distortion in the horizontal direction.

Third Embodiment

Figure 8:
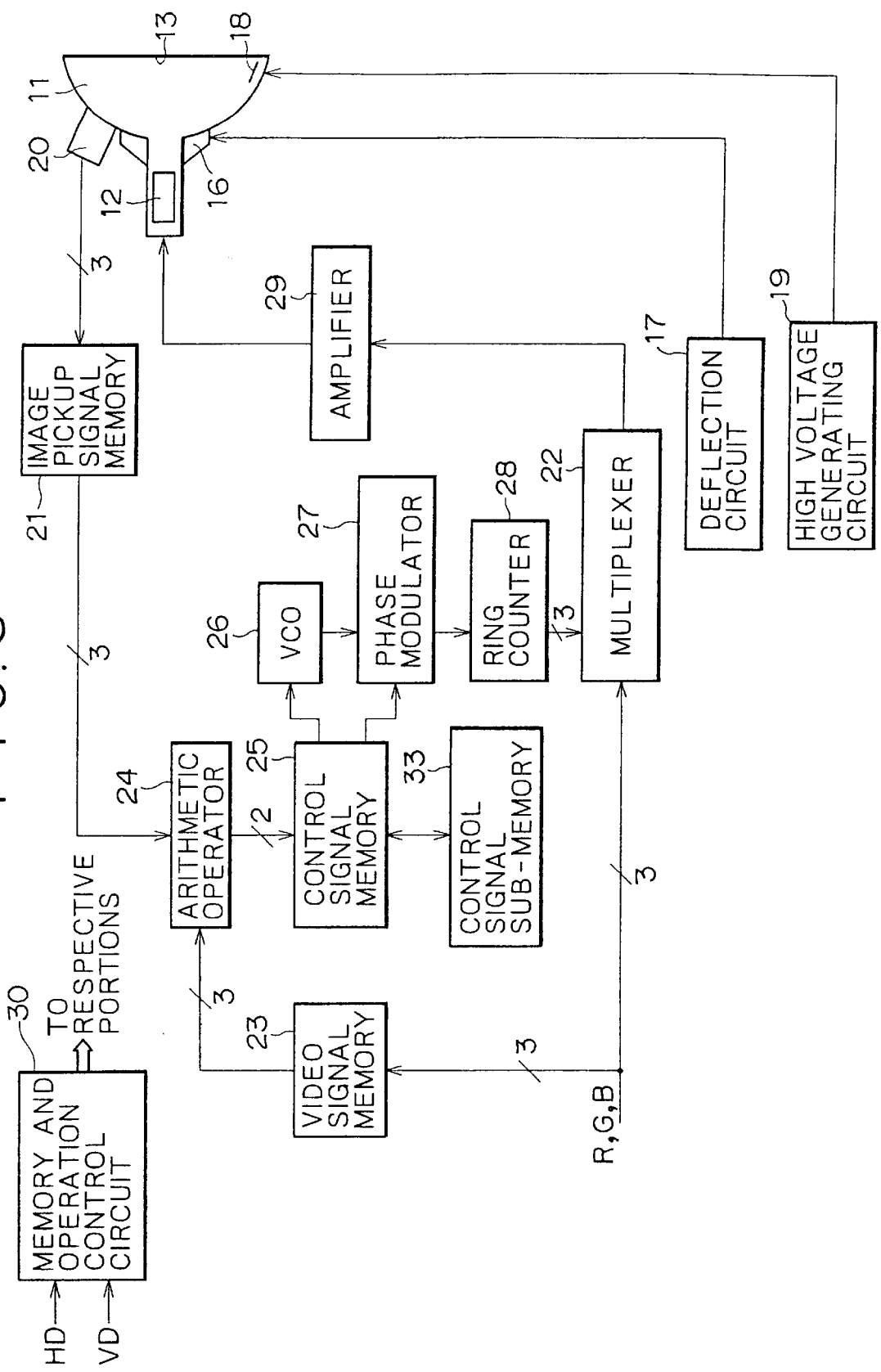
FIG. 8 is a block diagram showing the configuration of the color CRT display in the third embodiment.

FIG. 8 is the block diagram showing the configuration of a color CRT display in the third embodiment according to the present invention. In the color CRT display in the third embodiment, a control signal sub-memory 33, a fourth storage means, is added to the color CRT display in the first embodiment.

As the control signal sub-memory 33, a non-volatile memory or a memory having a backup power supply which supplies power to the display when the power supply is off, is added. Onto the control signal sub-memory 33, the data stored in the control signal memory 25 are copied right before the moment when the power supply of the display is turned off by the control of the memory and operation control circuit 30. When the power supply of the display is turned on, within the first field, the data stored in the control signal sub-memory 33 are copied to the control signal memory 25.

As mentioned in the above, in the color CRT display shown in the third embodiment, the control signal sub-memory 33, which is able to keep the data even during the period when the power supply of the display is off, is provided. Therefore, the data in the control signal memory 25 right before the moment when the power supply is to be turned off can be kept in the sub-memory 33. Thereby, when the power supply is turned on, it is possible to start the control based on the data right before the power supply is turned off, so that when the display is activated, the color reproduction operation can be performed almost immediately.

Fourth Embodiment

Figure 9:
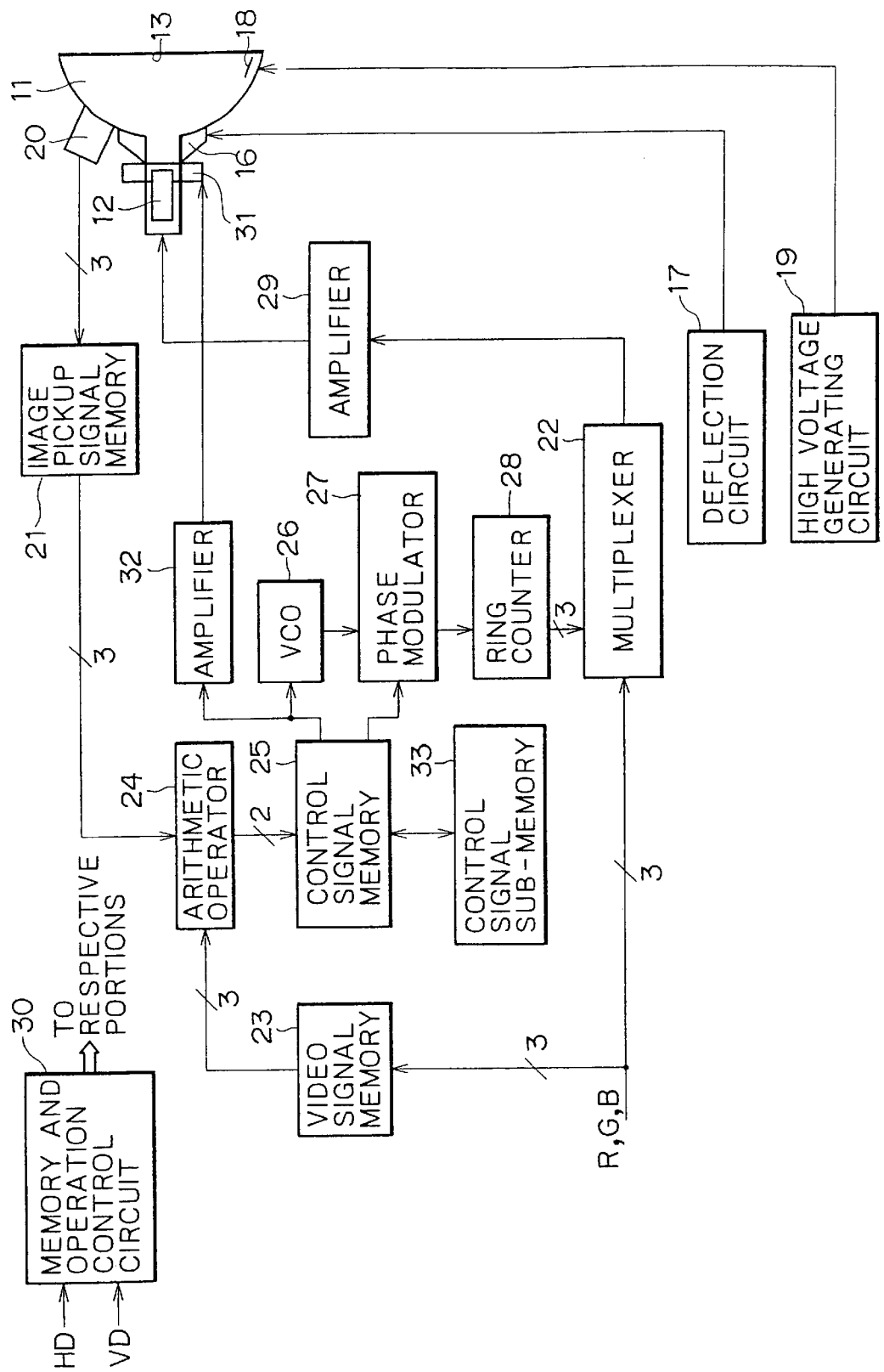
FIG. 9 is a block diagram showing the configuration of the color CRT display in the fourth embodiment.

FIG. 9 is a block diagram showing the configuration of a color CRT display in the fourth embodiment according to the present invention. In the color CRT display in the fourth embodiment, a correction means for correcting the linearity of the horizontal scanning and further a control signal sub-memory 33 are added to the color CRT display shown in the first embodiment.

In other words, the CRT 11 is provided with a sub-yoke 31 other than the deflection yoke 16, the frequency control data read out from the control signal memory 25 is amplified by the amplifier 32, and the data are supplied to the sub-yoke 31 as a driving voltage. In this configuration, other than the main deflection by the deflection yoke 16, the sub-horizontal deflection is performed by flowing a correction current through the sub-yoke 31 and as a sub-memory 33, a non-volatile memory or a memory having a backup power supply, is used.

As mentioned in the above, in the case of the color CRT display in the fourth embodiment, the sub-yoke 31 is provided; and, the sub-yoke 31 is driven by a voltage that is obtained based on the frequency control data read out from the frequency control data memory 25, so that sub-horizontal deflection is performed. Thereby, in the similar way to the color CRT display in the second embodiment, the linearity of the horizontal scanning can be improved and the image distortion in the horizontal direction can be removed.

Further, the control signal sub-memory 33, which is able to keep the data during the period in which the power supply of the display is off, is provided so that it is possible to keep the data which have been stored in the control signal memory 25 before the power supply is turned off. Thereby in the same way as the color CRT display shown in the third embodiment, when the power supply is turned on, the control can be started based on the data right before the power supply is turned off, so that when the the display is activated, the color reproduction can be performed almost immediately.

In each of the embodiments, explanations are given based on the assumption that the TV is of an interlace system; however, the present invention can be applied to the TV of non-interlace system. In the case of the interlace system, two fields constitute one frame, so that in the above embodiments, control is performed making one field as one unit (one vertical period=one field period). In the case of the non-interlace system, control is performed making one frame as one unit.

While preferred embodiments of the present invention have been described using specific terms, such description is for illustrative purposes only, and it is to be understood that changes and variations may be made without departing from the spirit or scope of the following claims.

What is claimed is:

1. A color CRT display having a one-beam electron gun emitting an electron beam and a fluorescent screen on which phosphor stripes for emitting R (red), G (green) and B (blue) rays of light respectively being irradiated by an electron beam, wherein said phosphor stripes is disposed in the main scanning direction of the electron beam, and respective chrominance signals are supplied to said one-beam electron gun being switched in regular succession to reproduce colors, comprising:

an image pickup device for picking up the image displayed on the screen of said CRT, first storage means for storing the image pickup signal output from said image pickup device, second storage means for storing an input video signal, switching means for switching respective chrominance signals, R, G, and B in said input video signal and supplying them to said one-beam electron gun, variable frequency oscillator means for outputting an oscillation frequency signal to be the base of the switching timing of chrominance signals by said switching means, phase modulation means for phase-modulating the oscillation signal output from said variable frequency oscillator means and supplying the modulated signal to said switching means as a switching control signal, and control means for comparing the component of chromaticity of the image pickup signal stored in said first storage means with the component of chromaticity of the video signal stored in said second storage means, and for controlling the oscillation frequency of said variable frequency oscillator and the phase modulation by said phase modulation means to make the above comparison result minimum.

2. A color CRT display according to claim 1, wherein said control means comprises a calculation means for dividing the screen of 1 field or 1 frame into a plurality of small areas, calculating the respective components of chromaticity from the stored data in said first and second storage means corresponding to each of the small areas, and obtaining the frequency control value of said variable frequency control means and the phase control value of said phase modulation means to make the difference between the respective components of chromaticity minimum, and a third storage means for storing said frequency control value and said phase control value obtained by said calculation means, and updates the data in said third storage means by adding the data obtained by said calculation means to the data read out from the third storage means.

3. A color CRT display according to claim 2, wherein said control means, when it reads out data from said third storage means, performs interpolative calculation so that the adjacent small areas are connected smoothly.

4. A color CRT display according to claim 2, wherein 1 vertical period of said image pickup device and 1 vertical period of said input video signal are set to be equal, and the process by said calculation means and the updating process of data in said third storage means are arranged to be completed within said 1 vertical period.

5. A color CRT display according to claim 4, wherein the screen of 1 field or 1 frame is divided into M parts in the vertical direction at equal intervals and into N parts in the horizontal direction at equal intervals, thus the screen is divided into M×N small areas.

6. A color CRT display according to claim 2, wherein 1 vertical period of said image pickup device is set longer than 1 vertical period of said input video signal, the shutter open period of said image pickup device is adjusted to 1 vertical period of said input video signal, and 1 vertical period of said input video signal is made to be included within 1 vertical period of said image pickup device, and the process by said calculation means and the update process of data in said third storage means are repeated at the period of difference between 1 vertical period of said image pickup device and 1 vertical period of said input video signal and should be completed within one repetition period.

7. A color CRT display according to claim 6, wherein the screen of 1 field or 1 frame is divided into M parts at equal intervals in the vertical direction and into N parts at equal intervals in the horizontal direction; thus said screen is divided into M×N small areas.

8. A color CRT display according to claim 2 wherein said display comprises a sub-yoke other than a main deflection yoke for deflecting said electron beam, and said control means reads out data from the third storage means in synchronization with the input video signal and drives said sub-yoke based on the data.

9. A color CRT display according to claim 2 wherein said display comprises a fourth storage means which is composed of a nonvolatile storage means or a storage means operated by a backup power supply and is operated to keep the data which have been stored in said third storage means at the moment right before the power supply of the display is switched off, and when the power supply is turned on, the data stored in said fourth storage means are copied onto the third storage means within the 1 field or 1 frame.

* * * * *